(12) United States Patent
Patton et al.

(10) Patent No.: US 8,948,177 B2
(45) Date of Patent: Feb. 3, 2015

(54) POLICY BASED ROUTING

(75) Inventors: Burson Keith Patton, Plano, TX (US); Jeffrey Vern Zwall, Oak Point, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/561,610

(22) Filed: Jul. 30, 2012

(65) Prior Publication Data
US 2014/0029619 A1    Jan. 30, 2014

(51) Int. Cl.
H04L 12/28    (2006.01)

(52) U.S. Cl.
USPC ............ 370/392; 370/230; 370/232; 370/380

(58) Field of Classification Search
CPC .................................................. H04L 47/2441
USPC .................................. 370/230, 232, 389, 392
See application file for complete search history.

(56) References Cited

U.S. PATENT DOCUMENTS

| | | | |
|---|---|---|---|
| 6,128,296 A * | 10/2000 | Daruwalla et al. ............ 370/389 |
| 6,314,465 B1 | 11/2001 | Paul et al. |
| 6,430,155 B1 * | 8/2002 | Davie et al. .................... 370/232 |
| 6,594,268 B1 | 7/2003 | Aukia et al. |
| 6,980,555 B2 * | 12/2005 | Mar .......................... 370/395.21 |
| 6,993,031 B2 * | 1/2006 | Murase ..................... 370/395.32 |
| 7,039,641 B2 * | 5/2006 | Woo .............................. 370/400 |
| 7,110,363 B1 * | 9/2006 | Lawrence et al. ........... 370/236.1 |
| 7,133,365 B2 * | 11/2006 | Klinker et al. ................ 370/238 |
| 7,286,535 B2 * | 10/2007 | Ishikawa et al. .............. 370/392 |
| 7,292,531 B1 * | 11/2007 | Hill ............................. 370/230.1 |
| 7,355,977 B1 * | 4/2008 | Li ............................... 370/235.1 |
| 7,415,012 B1 * | 8/2008 | Mankins ....................... 370/389 |
| 7,522,521 B2 * | 4/2009 | Bettink et al. ................ 370/230 |
| 7,545,809 B2 * | 6/2009 | Engbersen et al. ........... 370/392 |
| 7,554,919 B1 * | 6/2009 | Veeragandham et al. ..... 370/236 |
| 7,702,630 B2 * | 4/2010 | Basso et al. ................... 707/769 |
| 7,773,600 B2 * | 8/2010 | Ishikawa et al. .............. 370/392 |
| 7,925,624 B2 | 4/2011 | Vosshall et al. |
| 7,986,696 B1 * | 7/2011 | Miliavisky et al. ........... 370/392 |
| 8,266,506 B2 * | 9/2012 | Hao et al. ...................... 714/777 |
| 2002/0152209 A1 * | 10/2002 | Merugu et al. .................... 707/7 |
| 2004/0039839 A1 * | 2/2004 | Kalyanaraman et al. ..... 709/238 |
| 2005/0114704 A1 * | 5/2005 | Swander ....................... 713/201 |
| 2005/0213586 A1 | 9/2005 | Cyganski et al. |
| 2010/0135289 A1 * | 6/2010 | Bowes .......................... 370/389 |
| 2011/0235508 A1 * | 9/2011 | Goel et al. .................... 370/230 |
| 2012/0106560 A1 * | 5/2012 | Gumaste ....................... 370/401 |
| 2013/0246651 A1 * | 9/2013 | Keen et al. .................... 709/238 |

\* cited by examiner

*Primary Examiner* — Andrew Lai
*Assistant Examiner* — Andrew C Lee
(74) *Attorney, Agent, or Firm* — Mannava & Kang; Timothy Kang

(57) ABSTRACT

According to an example, a method for policy based routing may include receiving a data packet, and generating a weight table including an index corresponding to a weight based distribution of a plurality of redirect hosts. The method may further include generating a hash table including an index corresponding to a random distribution of the weight based distribution, using an IP address of the data packet to determine a corresponding index value in the hash table index, determining an availability status of a redirect host of the plurality of redirect hosts corresponding to the index value, and routing, by a processor, the data packet to the redirect host if the availability status is determined to be available.

15 Claims, 8 Drawing Sheets

| REDIRECT HOST TABLE | | |
|---|---|---|
| Index | Redirect Host in IP format | Status (up or down) |
| 1 | A -> ( 10.10.10.1 ) | Up |
| 2 | B -> ( 10.10.10.2) | Up |
| 3 | C-> ( 10.10.10.3 ) | Up |

Fig. 4

| WEIGHT TABLE | |
|---|---|
| Index | Redirect Host |
| 1 | A |
| 2 | A |
| 3 | A |
| 4 | A |
| 5 | A |
| 6 | B |
| 7 | B |
| 8 | B |
| 9 | C |
| 10 | C |

POLICY BASED ROUTING

BACKGROUND

Policy based routing (PBR) can be used to make routing decisions based on policies set, for example, by a network administrator. Typically, a router receiving a data packet can decide to forward the data packet based on the destination address in the data packet. However, PBR may instead direct the data packet to be forwarded based on the source or destination address. PBR may also direct the data packet to be forwarded based on other criteria, such as the size of the data packet or other information available in a data packet header. Existing techniques of PBR can be insufficient in various cases.

BRIEF DESCRIPTION OF DRAWINGS

Features of the present disclosure are illustrated by way of example and not limited in the following figure(s), in which like numerals indicate like elements, in which:

FIG. 4 illustrates an example of a redirect host table for the policy based routing apparatus, according to an example of the present disclosure;

FIG. 5 illustrates an example of a weight table for the policy based routing apparatus, according to an example of the present disclosure;

DETAILED DESCRIPTION

Figure 1:
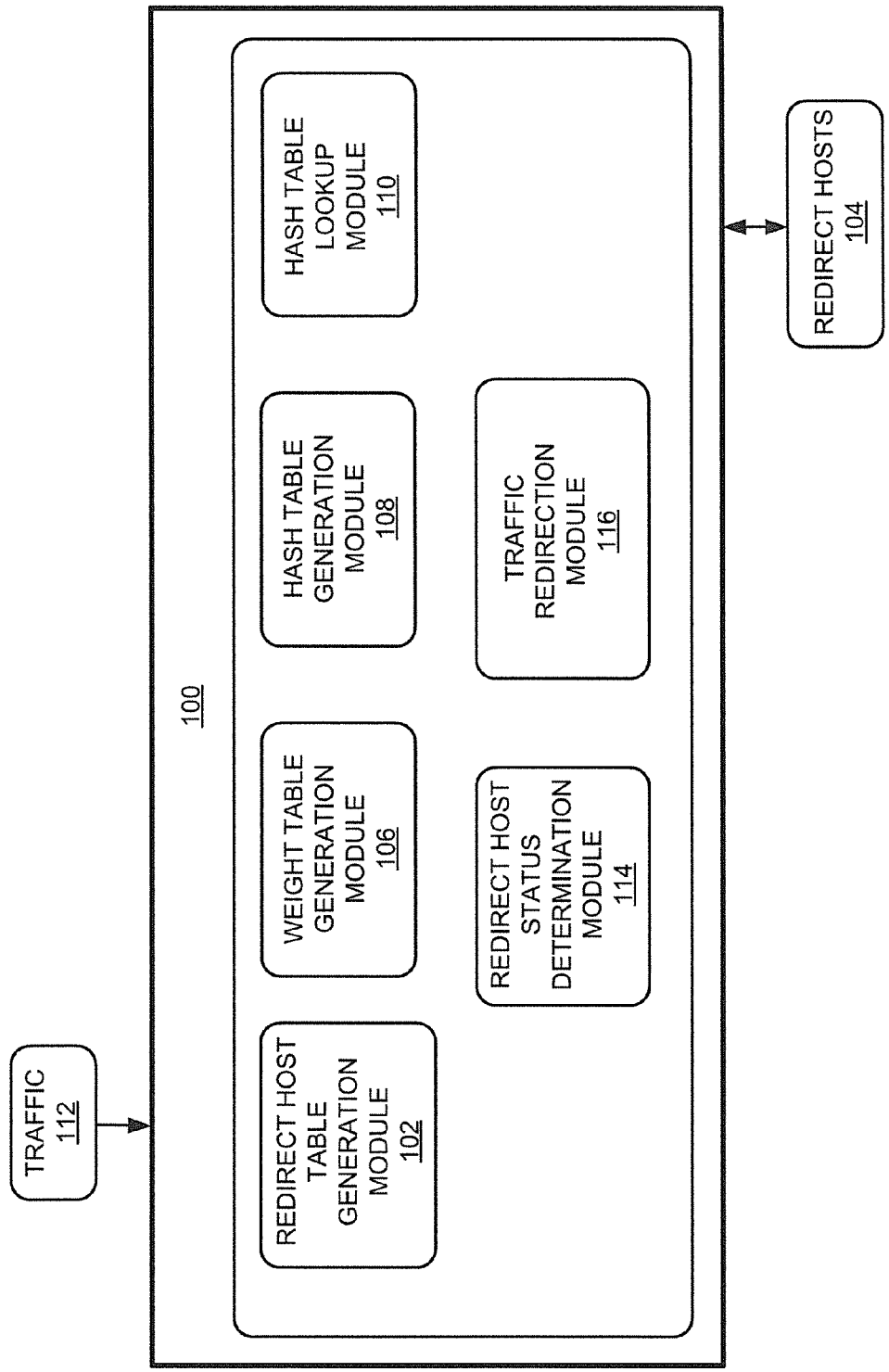
FIG. 1 illustrates an architecture of a policy based routing apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A policy based routing (PBR) method and apparatus are described herein and generally provide for distribution of traffic redirection to a set of ancillary devices that perform a task on a data packet in a traffic stream. The traffic stream may be received, for example, on an incoming interface of a router. The PBR method and apparatus may be implemented, for example, on a router or as a separate control for a router or any device receiving the traffic stream. The ancillary devices may include redirect hosts that receive and perform the task on the data packet. The redirect hosts may include internet protocol (IP) addresses that are IPv4 or IPv6. For IPv4, the address may be written in any notation expressing a 32-bit integer value. Generally, IPv4 addresses are written in a dot-decimal notation, which consists of four octets of the address expressed individually in decimal and separated by periods (e.g., 172.14.234.2). For IPv6, the address includes eight groups of four hexadecimal digits, separated by colons. For IPv6, the length of the address is 128 bits, compared to 32 bits for IPv4.

The PBR method and apparatus provide for redirection of IP traffic to specified redirect hosts, which may be grouped. The redirection may be based on the source IP address, the destination IP address, and/or the interface port information of the interface that receives the traffic. The PBR method and apparatus also support virtual routing and forwarding (VRF). In addition, the redirection includes a weighted distribution of the redirection hosts based on the capacity of the redirection hosts for performing a desired task. The PBR method and apparatus may provide traffic redirection based on the entire IP address range, for example, for both IPv4 and IPv6 addresses. The redirection may also be based on a subset of an IP address range. The PBR method and apparatus provide verification of the status of a redirect host prior to traffic redirection, which provides a failover procedure to account for a redirect host that may be unavailable.

In an example, the PBR method and apparatus generally include generation of a redirect host table including the IP addresses of redirect hosts and their statuses. In addition, a weight table including a weight based distribution of the redirect hosts may be used to generate a hash table including a predetermined number of randomly distributed redirect hosts. The weight and hash tables may include the names and/or IP addresses of the redirect hosts. A lookup of the hash table may be performed to provide an index value to determine which redirect host is to receive traffic. An availability of a redirect host may be determined prior to redirection of traffic to the redirect host. If the redirect host is unavailable, traffic is redirected to another host and flows as it would without any redirection to avoid traffic backlog. Once an appropriate redirect host is determined, traffic is directed to the redirect host. According to an example, the PBR method and apparatus disclosed herein eliminate the need of an external load balancing device by redirecting traffic based on lookup of the hash table that is based on a random distribution of weighted redirect hosts.

FIG. 1 illustrates an architecture of a policy based routing apparatus 100, according to an example. Referring to FIG. 1, the apparatus 100 is depicted as including a redirect host table generation module 102 to generate a redirect host table including the Internet protocol (IP) addresses of redirect hosts 104 and their statuses. A weight table generation module 106 is to generate a weight table including a weight based distribution of IP addresses of the redirect hosts 104. A hash table generation module 108 is to generate a hash table including a predetermined number of redirect hosts represented in a random distribution. A hash table lookup module 110 is to provide an index value in a hash table index to determine which redirect host is to receive traffic 112. A redirect host status determination module 114 is to determine an availability of a redirect host. A traffic redirection module 116 is to direct the traffic 112 to one of the redirect hosts 104.

The modules 102, 106, 108, 110, 114, and 116, and other components of the apparatus 100 that perform various other functions in the apparatus 100, may comprise machine readable instructions stored on a computer readable medium. In addition, or alternatively, the modules 102, 106, 108, 110, 114, and 116, and other components of the apparatus 100 may comprise hardware or a combination of machine readable instructions and hardware.

Figure 2:
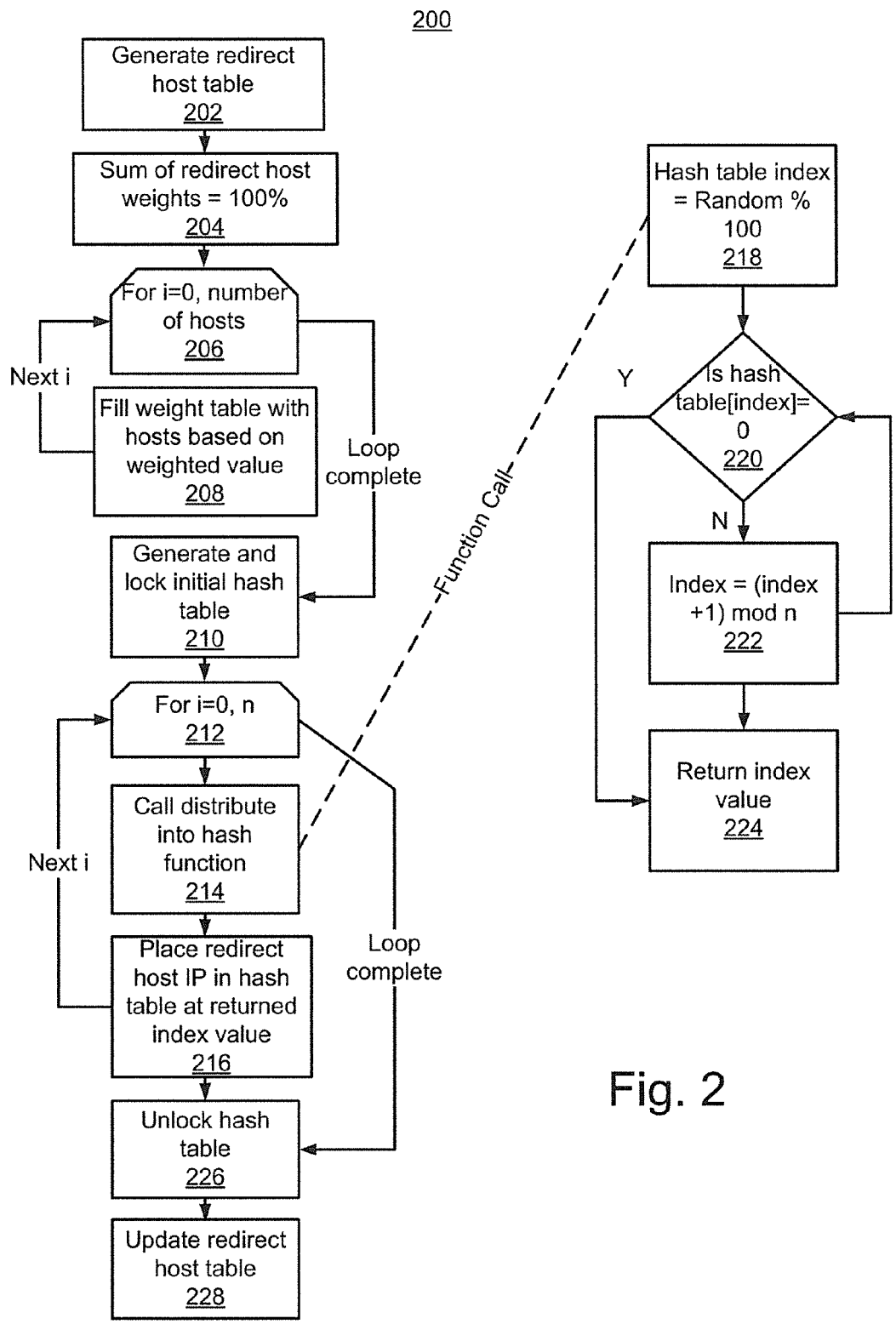
FIG. 2 illustrates a flowchart for setup of a hash table for the policy based routing apparatus, according to an example of the present disclosure.

Referring to FIG. 1, in order to direct the traffic 112 to one of the redirect hosts 104, the redirect host table generation module 102 may generate a redirect host table including the IP addresses of the redirect hosts 104 and their statuses. Referring to FIG. 2, there is shown a flowchart 200 for setup of a hash table for the policy based routing apparatus 100, according to an example. At block 202, the redirect host table generation module 102 generates a redirect host table. Referring to FIG. 4, an example of a redirect host table 400 for three redirect hosts A, B, and C is shown. The redirect host table 400 may include an index column 402, a redirect host address in IP format column 404, and a redirect host status column 406. The IP addresses of the redirect hosts 104 may be IPv4 or IPv6, or any other format. The redirect host status column 406 may include the status of a redirect host as either up (i.e., available) or down (i.e., not available). The status of the redirect hosts provides a health check of the redirect hosts.

At block 204, the redirect hosts 104 are assigned a weight such that the sum of the weights is equal to 100%. For example, for the example of the redirect hosts A, B, and C, the weight may be specified such that A=50%, B=30% and C=20%, with the sum of the weights being equal to 100%. The weights for the redirect hosts 104 may be based, for example, on the capacity of a redirect host to handle the traffic 112. For example, a higher capacity redirect host may be assigned a higher weight compared to other redirect hosts in a group of the redirect hosts 104.

Figure 6:
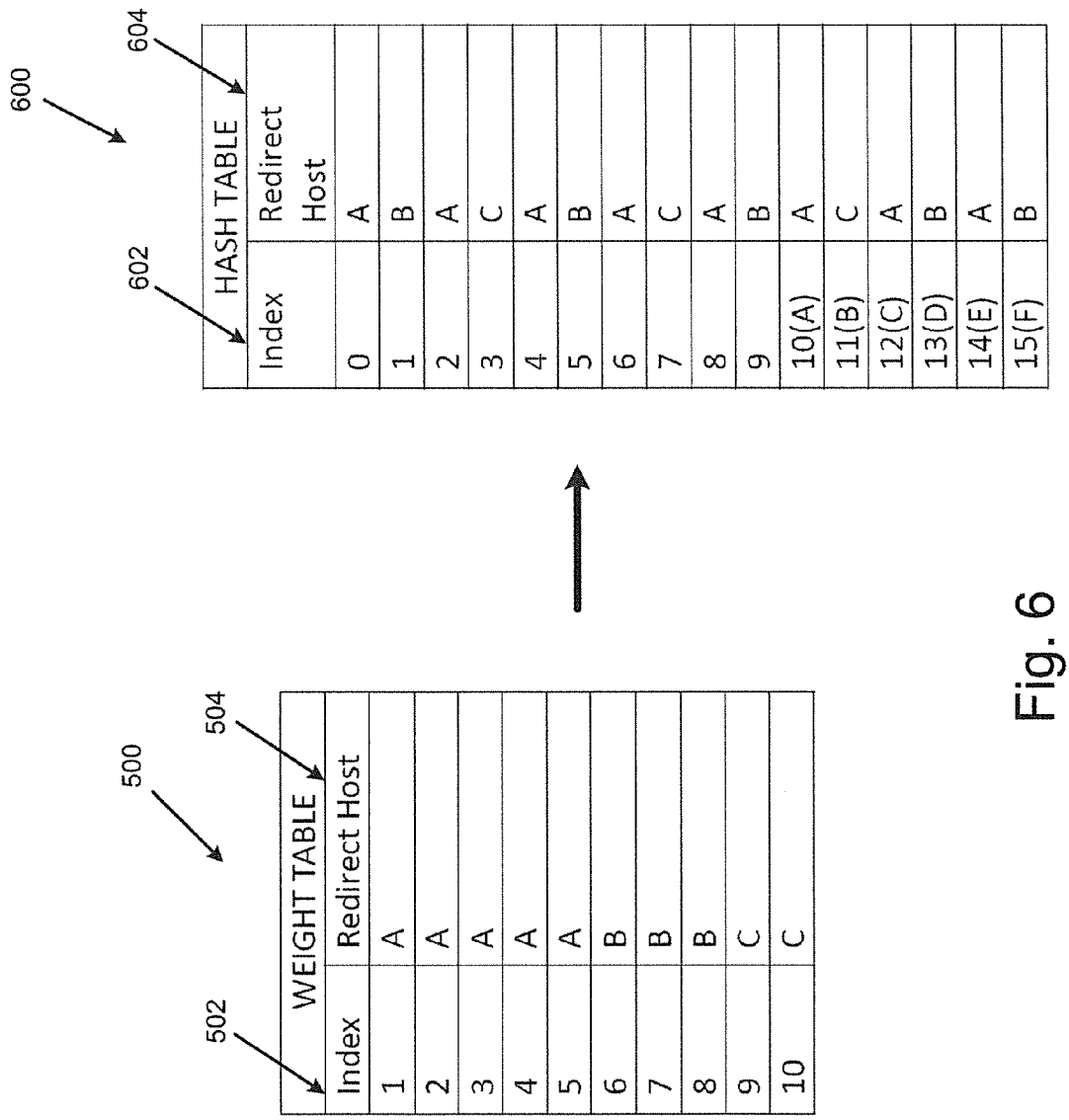
FIG. 6 illustrates an example of a hash table for the policy based routing apparatus, according to an example of the present disclosure.

At blocks 206 and 208, based on the weights assigned to the redirect hosts 104, the weight table generation module 106 generates a weight table including a weight based distribution of the redirect hosts 104. The weight table may include a predetermined number of entries holding the IP addresses of the redirect hosts 104. The predetermined number of entries may be based, for example, on a base-10 or base-16 numbering system to facilitate hash table generation and lookup for IPv4 and IPv6 address formats. To accommodate both IPv4 and IPv6 addresses, the weight table may include 256 entries (e.g., $2^8$ entries) or other multiples of base-16 entries (e.g. 32768, etc.) to facilitate hash table generation and lookup. Alternatively, if the weight table includes n entries, the n entries may be converted to a base-16 format for generating the hash table. The conversion of the weight table to a base-16 format may use additional computational resources, which can be minimized by using a base-16 format for both the weight and hash tables. For example, for the foregoing example including redirect hosts A, B, and C, FIGS. 5 and 6 show a simplified example of a weight table 500 including 10 entries (i.e., n=10) and a hash table 600 for which the 10 entries of the weight table 500 are converted to a base-16 format to include 16 entries (i.e., $2^4$ entries). In this manner, a weight table including any number of entries (e.g., 10, 100, 1000, etc.) may be converted to a desired format (e.g., a hash table with 256, 32768 or other multiples of base-16 entries etc.) for a hash table for use with IPv4, IPv6 or another address format. The higher number of entries for a hash table may be used if more than one octet of the data packet IP address is used for hash table lookup, as described below.

In order to generate the weight table, at blocks 206 and 208, the weight table generation module 102 loops thru each list of corresponding redirect hosts 104. For a weight table including 256 entries, the number of entries for each redirect host within the weight table matches the weight value multiplied by 2.56. For example, if a redirect host has a weight value of 20, 51 entries are made in the weight table (i.e., 2.56×20). In the case where no weight is specified, the redirect hosts 104 may be distributed evenly across the 256 total entries in the weight table. For example, for the foregoing example including redirect hosts A, B, and C with weights of A=50%, B=30% and C=20%, a simplified example of the weight table 500 including 10 entries is shown in FIG. 5 and includes the redirect hosts A, B, and C distributed according to the assigned weights. The weight table 500 may include an index column 502 and a corresponding redirect host column 504.

With the weight table populated, at block 210, the hash table generation module 108 generates an initial hash table. If the weight table includes 256 entries, the hash table may similarly include 256 entries for facilitating hash table lookup. The entries of the initial hash table may be initially filled with zeros. Once the hash table is created, a lock is placed on the hash table to ensure exclusive access and to prohibit access from other processes. This ensures a redirection will not be executed based on a table in update status.

At blocks 212, 214, and 216, the hash table generation module 108 loops thru each entry in the weight table invoking the hash table entry function of blocks 218, 220, 222, and 224. For block 212, if a hash table includes 256 entries, n=255. At block 214, the hash table entry function is called to return an index value within the hash table. At block 216, the redirect host IP is inserted into the hash table at the index value provided by the hash table entry function. The hash table entry function of blocks 218, 220, 222, and 224 randomizes the entries into the hash table to provide a generally unskewed distribution of the entries in the hash table. Randomization of the entries also provides a distributed manner for placing weighted entries into the hash table. Generally, the hash table entry function retries a random number from a random number generator within the range of 0-n. If a hash table includes 256 entries, n=255. The resulting number becomes the index value into the hash table. At block 218, the hash table entry function initiates determination of an index value for the hash table. At block 220, the hash table entry function uses a random number generator to generate a random index value and tests the hash table with the determined index value to insure the corresponding entry contains all zeros. If this test fails, which means that the entry has already been populated, at block 222, the hash table entry function calls the random number generator again for another value. Once the hash table entry function obtains an index pointing to a zero entry, at block 224, the hash table entry function returns that index value to the setup routine. The process of blocks 218, 220, 222, and 224 is repeated until the hash table is populated with a random distribution of the weighted redirect hosts 104. For example, for the foregoing example including redirect hosts A, B, and C with weights of A=50%, B=30% and C=20%, for the simplified example of the weight table 500 including 10 entries shown in FIG. 5, the hash table 600 is shown in FIG. 6. The hash table 600 of FIG. 6 is converted to a base-16 format for facilitating hash table lookup. Using the processes described with respect to blocks 212, 214, 216, 218, 220, 222 and 224, the hash table generation module 108 populates the hash table with a random distribution of the weighted redirect hosts. The hash table 600 may include an index column 602 and a corresponding redirect host column 604.

At block 226, once the hash table is populated, the hash table is unlocked to permit access from other processes. At block 228, the redirect host table may be updated, if needed, to update the IP addresses and status of the redirect hosts 104. If the number of redirect hosts per the redirect host table updated at block 228 is modified compared to the redirect host table generated at block 202, the hash table is likewise modified beginning at block 204.

Figure 3:
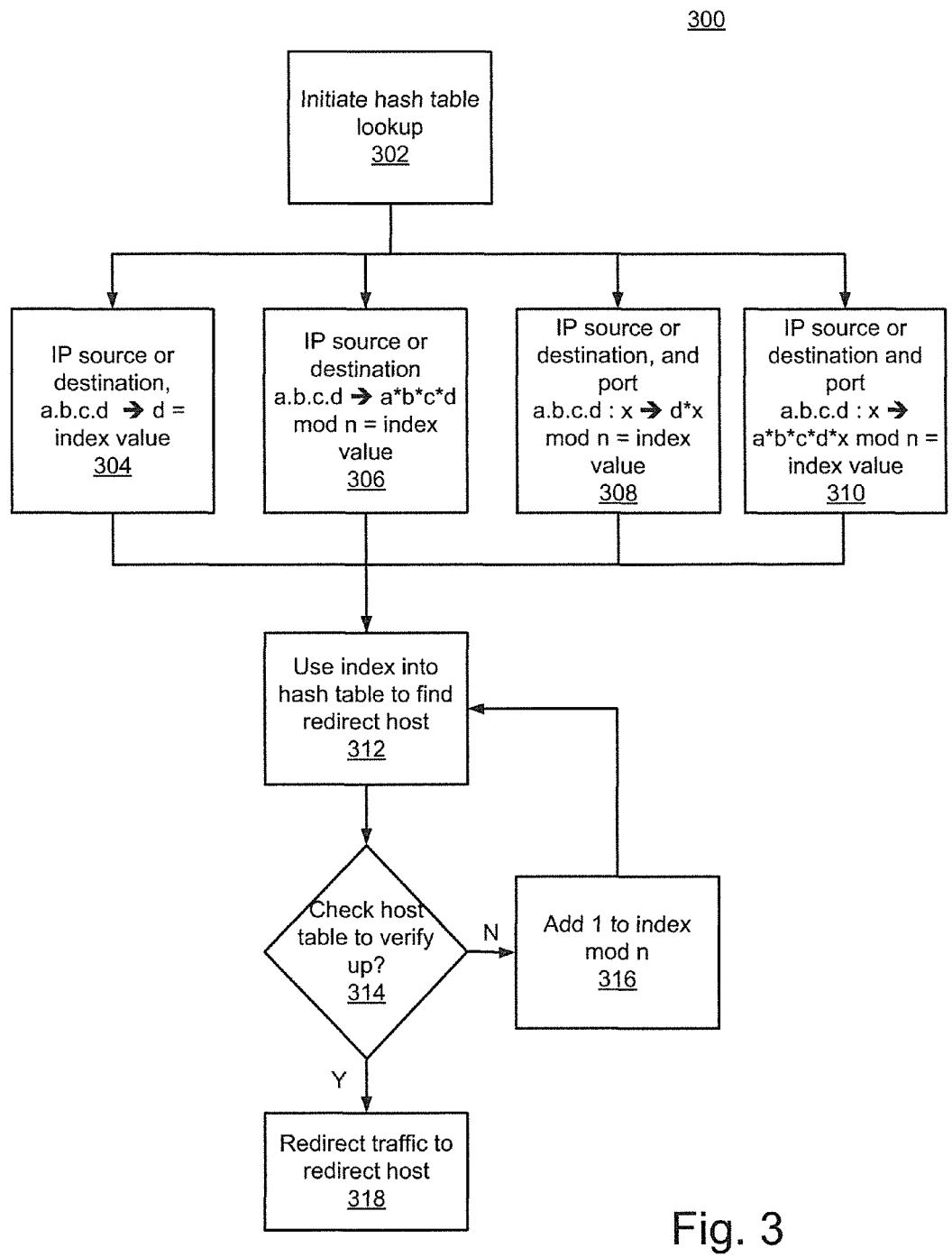
FIG. 3 illustrates a flowchart for hash table lookup for the policy based routing apparatus, according to an example of the present disclosure.

With the hash table populated and unlocked, the hash table lookup module 110 performs a hash table lookup to direct the traffic 112 to one of the redirect hosts 104. The lookup into the hash table may be performed by four alternative methods. Each hash table lookup method returns an index value for the hash table. The index value also corresponds to a redirect host in the redirect host table 400, which includes redirect host addresses and availability. The index value corresponds to the redirect host that is to receive the traffic 112. Referring to FIG. 3, which depicts a flowchart 300 for hash table lookup, according to an example, at block 302, hash table lookup is initiated. Hash table lookup is based on the hash table lookup method (e.g., one of the four alternative methods described below) specified in the configuration of the apparatus 100.

The first method of hash table lookup uses the last octet of the IP address of a data packet from the traffic 112 as the index value for the hash table. The IP address of the data packet used can be either the source IP address or the destination IP address as specified in the configuration of the apparatus 100. If the source IP address for the data packet is used at an incoming interface (e.g., of a router), the destination IP address (i.e., IP address of the redirect host) is used on a return interface to ensure the bi-directional traffic redirection is symmetric. Likewise, if the destination IP address is used at the incoming interface, the source IP address is used on the return interface. Since the last octet of the IP address and the hash table of 256 entries ranges from 0 to 255, a one to one match is achieved. Further, by using the last octet, the hash table distribution of IP addresses includes a random distribution since the other three octets (i.e., for IPv4) generally remain unchanged. Therefore referring to FIG. 3, at block 304, for an IP source or destination address in the form of a.b.c.d, the last octet of the IP address (i.e., d) of a data packet from the traffic 112 is used as the index value to the hash table to map to a redirect host for directing the traffic 112. For example, for the foregoing example including redirect hosts A, B, and C, assuming the IP source address of a data packet has a last four bits of binary 0010 (i.e., decimal 2), for the hash table 600 of FIG. 6, the index value of 2 maps to redirect host A. If the hash table includes 256 entries, then the last octet of the IP source address of 00000010 (i.e., decimal 2) would be similarly used as an index value into the hash table to map to redirect host A for directing the traffic 112.

The second method of hash table lookup takes all four of the individual octets for an IPv4 address and multiplies them together. In IPv6, the second method takes the lower eight octets. If the source IP address for the data packet is used at an incoming interface (e.g., of a router), the destination IP address (i.e., IP address of the redirect host) is used on a return interface to ensure the bi-directional traffic redirection is symmetric. Likewise, if the destination IP address is used at the incoming interface, the source IP address is used on the return interface. The result is fed into the modulo function. For the modulo function, given two positive numbers (i.e., a (the dividend) and n (the divisor)), a modulo n is the remainder on division of a by n. For modulo 256 (i.e., n=256), the modulo function returns an index value between 0 and 255. The dividend is equal to the number chosen for the hash table size, which can be variable $2^n$. Therefore, referring to FIG. 3, at block 306, for an IP source or destination address in the form of a.b.c.d, the individual octets are multiplied together (i.e., axbxcxd), and the result is fed into the modulo function, which returns an index value between 0 and 255. The returned index value is used as the index value to the hash table for directing the traffic 112.

The third method of hash table lookup combines the IP address with the transmission control protocol (TCP) or the user datagram protocol (UDP) port related to the traffic 112. The third method further distributes the redirect host distribution in the hash table, for example, where a few of the redirect hosts 104 include many ports that need redirection. If the source IP address for the data packet is used at an incoming interface (e.g., of a router), the destination IP address (i.e., IP address of the redirect host) is used on a return interface to ensure the bi-directional traffic redirection is symmetric. Likewise, if the destination IP address is used at the incoming interface, the source IP address is used on the return interface. The third method of hash table lookup uses the last octet of the IP address, multiplies the last octet by the port related to the traffic 112, and then uses the modulo function to return an index value. For modulo 256 (i.e., n=256), the modulo function returns an index value between 0 and 255. Therefore referring to FIG. 3, at block 308, for an IP source or destination address in the form of a.b.c.d, the last octet (i.e., d) is multiplied by the port (i.e., x), and the result is fed into the modulo function, which returns an index value between 0 and 255. The returned index value is used as the index value to the hash table for directing the traffic 112.

The fourth method of hash table lookup multiplies each octet (i.e., all four of the individual octets for IPv4 addresses and the lower eight octets in IPv6 addresses) and the TCP/UDP port, and then uses the modulo function to return an index value. For modulo 256 (i.e., n=256), the modulo function returns an index value between 0 and 255. If the source IP address for the data packet is used at an incoming interface (e.g., of a router), the destination IP address (i.e., IP address of the redirect host) is used on a return interface to ensure the bi-directional traffic redirection is symmetric. Likewise, if the destination IP address is used at the incoming interface, the source IP address is used on the return interface. Therefore, referring to FIG. 3, at block 310, for an IP source or destination address in the form of a.b.c.d, the individual octets are multiplied together (i.e., a*b*c*d) with the port (i.e., x), and the result is fed into the modulo function, which returns an index value between 0 and 255. The returned index value is used as the index value to the hash table for directing the traffic 112.

The first method of hash table lookup may be used if it is determined that IP addresses of incoming data packets are generally distributed randomly. Depending on a population represented by the source, the destination or the application distribution, one of the foregoing methods may provide a better distribution. For example, if the initial population is small with a wide range of applications, the third or fourth methods of hash table lookup would provide a better distribution since they account for the TCP/UDP port. Likewise if the population is small and on many networks, the first and second methods of hash table lookup would provide a better distribution.

Once an index value is obtained, at block 312, the index value is used as an offset into the hash table to obtain the next hop IP address of the redirect host for the traffic 112. For example, for the first method of hash table lookup, for the foregoing example including redirect hosts A, B, and C, assuming the IP source address has a last octet of binary 0010 (i.e., decimal 2), for the hash table 600 of FIG. 6, the index value of 2 maps to the redirect host A. At block 314, the redirect host status determination module 114 verifies the next hop IP address of the redirect host against a redirect host table to ensure the redirect host is active. For example, for the foregoing example including redirect hosts A, B, and C, the redirect host table 400 may include the index column 402, the redirect host address in IP format column 404, and the redirect host status column 406. The index value of 2 which maps to the redirect source A shows the status of the redirect source A is "up" (i.e., available). If the redirect host is inactive (i.e., down or unavailable), at block 316, the previous index value is incremented by 1 and a new IP address is retrieved based on the new index value. The new IP address of the new redirect host is verified again against the redirect host table 400 to ensure the new redirect host is active. Should the index reach a maximum (e.g., for the hash table including 256 entries, the index becomes 255), the index is then reset to 0. The analysis of blocks 312, 314 and 316 is repeated until an active redirect host is retrieved. The analysis of blocks 312, 314 and 316 impacts flows to the redirect host that becomes inactive and does not impact other active redirect hosts. When at least one member of the redirect hosts 104 responds, the redirect host table (e.g., the redirect host table of FIG. 4) is unlocked for a redirect group including the available redirect host. If all redirect hosts 104 are unavailable, the redirect host table remains locked. The polling at blocks 312, 314 and 316 may use either an internet control message protocol (ICMP) ping to verify the IP address is reachable or initiate a TCP connection in order to verify that the redirect host is available to receive the traffic 112.

At block 318, once an active redirect host is determined, the traffic redirection module 116 uses the IP address (i.e., the IP address of the redirect host determined from blocks 312, 314 and 316) of the next hop to forward the traffic 112. For example, for the first method of hash table lookup, for the foregoing example including redirect hosts A, B, and C, assuming the IP source address has a last octet of binary 0010 (i.e., decimal 2), for the hash table 600 of FIG. 6, the index of 2 maps to the redirect host A. Since the index of 2 which maps to the redirect host A shows the status is "up", the destination of the data envelope (i.e., the data packet on the incoming interface) is replaced with the new destination of the redirect host A, which is 10.10.10.1 in the example of FIG. 7.

For the policy based routing apparatus 100, redirection of the traffic 112 may be based on a determination within the routing apparatus code for the incoming interface. The routing apparatus code decides whether or not a data packet is to be redirected. The decision to redirect a data packet may be based on a redirect being specified within an interface definition. The decision to redirect the data packet may also be based on an access control list (ACL) within the redirect having a result of true. Further, the decision to redirect the data packet may be based on the redirect group including the redirect host table being unlocked, as discussed above with reference to the redirect host table. If the redirect host table is locked, this means that no redirect host is available for redirection, and in this case, the incoming interface ignores any redirect request and proceeds as if no redirect is specified.

Figure 7:
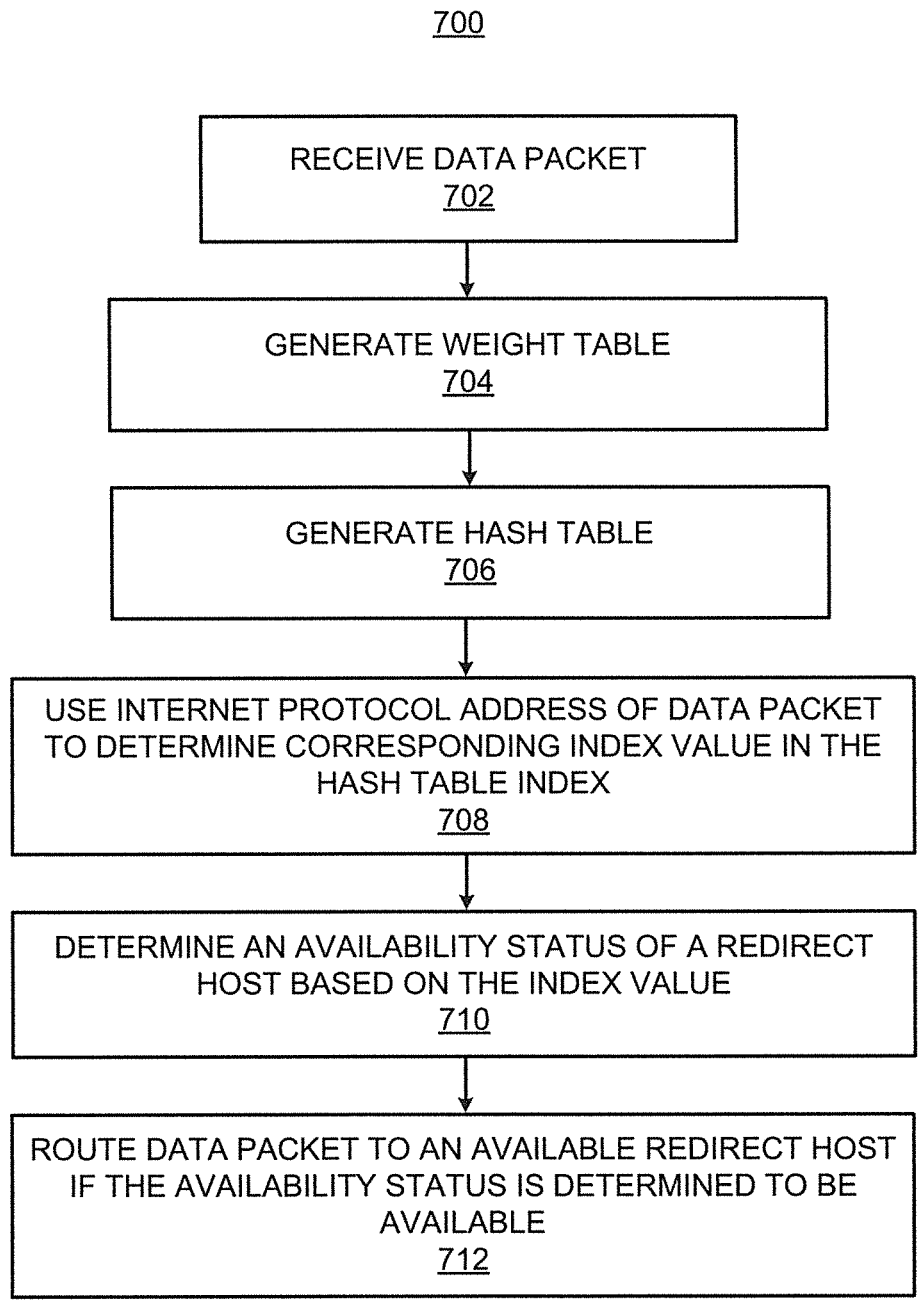
FIG. 7 illustrates a method for policy based routing, according to an example of the present disclosure.
Figure 8:
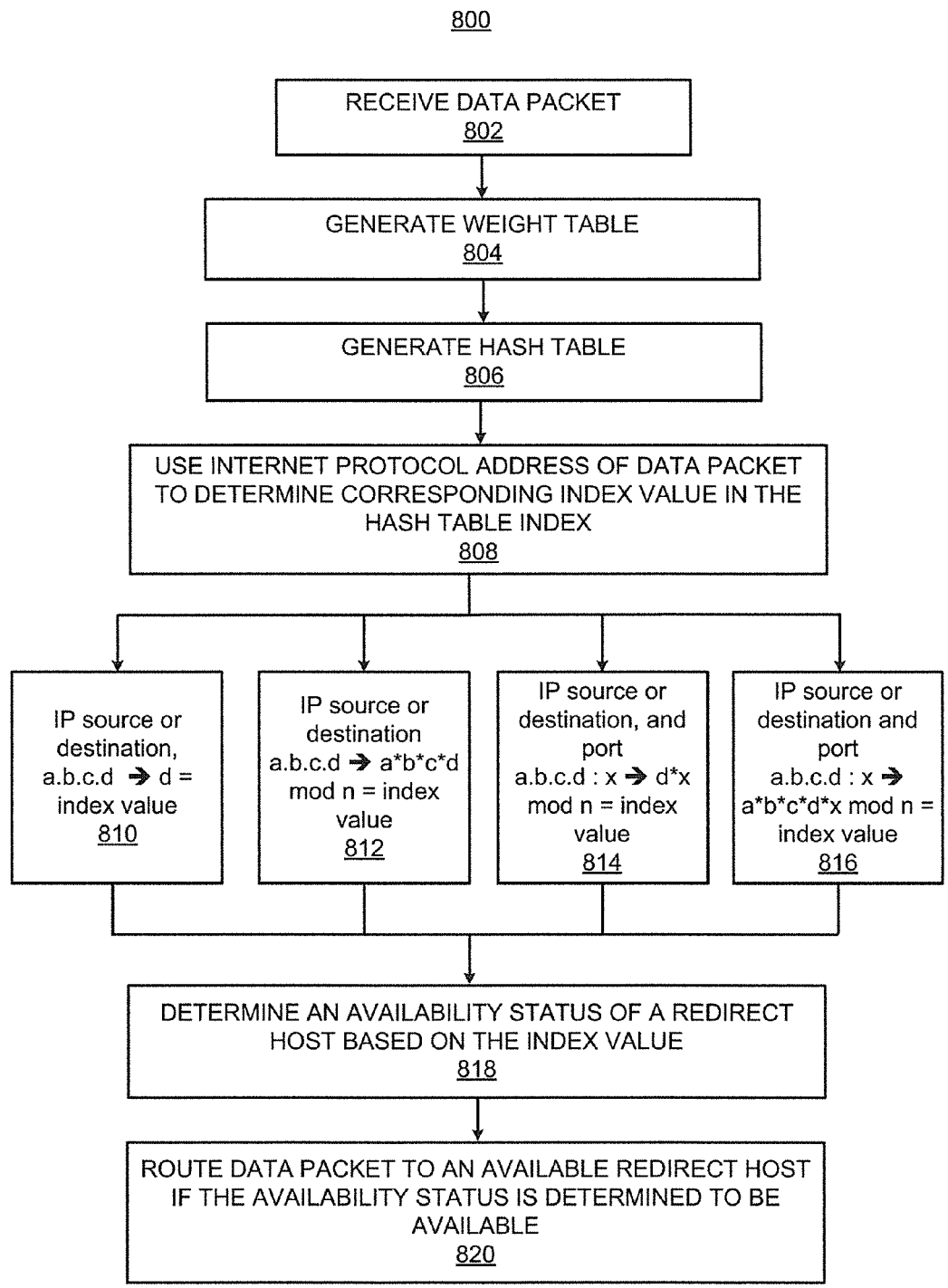
FIG. 8 illustrates further details of the method for policy based routing, according to an example of the present disclosure.

FIGS. 7 and 8 respectively illustrate flowcharts of methods 700 and 800 for policy based routing, corresponding to the example of the policy based routing apparatus 100 whose construction is described in detail above, according to examples. The methods 700 and 800 may be implemented on the policy based routing apparatus 100 with reference to FIG. 1 by way of example and not limitation. The methods 700 and 800 may be practiced in other apparatus.

Referring to FIG. 7, for the method 700, at block 702, a data packet is received. For example, referring to FIG. 1, the traffic 112 including a data packet is received at an incoming interface. The incoming interface may be an interface of a router.

At block 704, a weight table including an index corresponding to a weight based distribution of a plurality of redirect hosts is generated. For example, referring to FIG. 1, the weight table generation module 106 generates a weight table including a weight based distribution of IP addresses of the redirect hosts 104.

At block 706, a hash table including an index corresponding to a random distribution of the weight based distribution is generated. For example, referring to FIG. 1, the hash table generation module 108 generates a hash table including a predetermined number of randomly distributed IP addresses of the redirect hosts.

At block 708, an IP address of the data packet is used to determine a corresponding index value in the hash table index. For example, referring to FIG. 1, the hash table lookup module 110 provides an index value into the hash table to determine which redirect host is to receive traffic 112.

At block 710, an availability status of a redirect host of the plurality of redirect hosts corresponding to the index value is determined. For example, referring to FIG. 1, the redirect host status determination module 114 determines an availability of a redirect host. If the availability status is determined to be unavailable, the data packet is routed to a next available redirect host. For example, referring to FIG. 3, at blocks 312, 314 and 316, if the availability status is determined to be unavailable, the data packet is routed to a next available redirect host.

At block 712, the data packet is routed to the redirect host if the availability status is determined to be available. For example, referring to FIG. 1, the traffic redirection module 116 directs the traffic 112 to one of the available redirect hosts 104.

Referring to FIG. 8, for the method 800, at block 802, a data packet is received. The data packet may be received at an incoming interface of a router.

At block 804, a weight table including an index corresponding to a weight based distribution of a plurality of redirect hosts is generated. A number of entries in the weight table index may be based on a format of the IP address of the data packet. For example, to accommodate both IPv4 and lPv6 addresses, the weight table may include 256 entries (e.g., $2^8$ entries) to facilitate hash table generation and lookup. Alternatively, if the weight table includes n entries, the n entries may be converted to a base-16 format for generating the hash table.

At block 806, a hash table including an index corresponding to a random (e.g., calculated) distribution of the weight based distribution is generated. Alternatively, the hash table index may correspond to an un-skewed distribution that may be either random, calculated, or otherwise determined. A number of entries in the hash table index may be based on a format of the IP address of the data packet.

At block 808, an IP address of the data packet is used to determine a corresponding index value in the hash table index. A subset of the IP address of the data packet may be used to determine the corresponding index value in the hash table index.

At block 810, a lookup of the hash table may be performed by matching an octet of the IP address of the data packet with the hash table index to determine the index value. For example, referring to FIG. 3, at block 304, for an IP source or destination address in the form of a.b.c.d, the last octet of the IP address (i.e., d) of a data packet from the traffic 112 is used as the index value to the hash table to map to a redirect host for directing the traffic 112.

At block 812, a lookup of the hash table may be performed by multiplying a plurality of octets of the IP address of the data packet to generate a result. The result may be used in a modulo function to determine a hash table lookup value, and the lookup of the hash table is performed by matching the hash table lookup value with the hash table index to determine the index value. For example, referring to FIG. 3, at block 306, for an IP source or destination address in the form of a.b.c.d, the individual octets are multiplied together (i.e., a*b*c*d), and the result is fed into the modulo function, which returns an index value between 0 and 255.

At block 814, a lookup of the hash table may be performed by multiplying an octet of the IP address of the data packet with a port value associated with the IP address to generate a result. The result may be used in a modulo function to determine a hash table lookup value, and the lookup of the hash table is performed by matching the hash table lookup value with the hash table index to determine the index value. For example, referring to FIG. 3, at block 308, for an IP source or destination address in the form of a.b.c.d, the last octet (i.e., d) is multiplied by the port (i.e., x), and the result is fed into the modulo function, which returns an index value between 0 and 255.

At block 816, a lookup of the hash table may be performed by multiplying a plurality of octets of the IP address of the data packet with a port value associated with the IP address to generate a result. The result may be used in a modulo function to determine a hash table lookup value, and the lookup of the hash table is performed by matching the hash table lookup value with the hash table index to determine the index value. For example, referring to FIG. 3, at block 310, for an IP source or destination address in the form of a.b.c.d, the individual octets are multiplied together (i.e., a*b*c*d) with the port (i.e., x), and the result is fed into the modulo function, which returns an index value between 0 and 255.

At block 818, an availability status of a redirect host of the plurality of redirect hosts corresponding to the index value is determined.

At block 820, the data packet is routed to the redirect host if the availability status is determined to be available.

Figure 9:
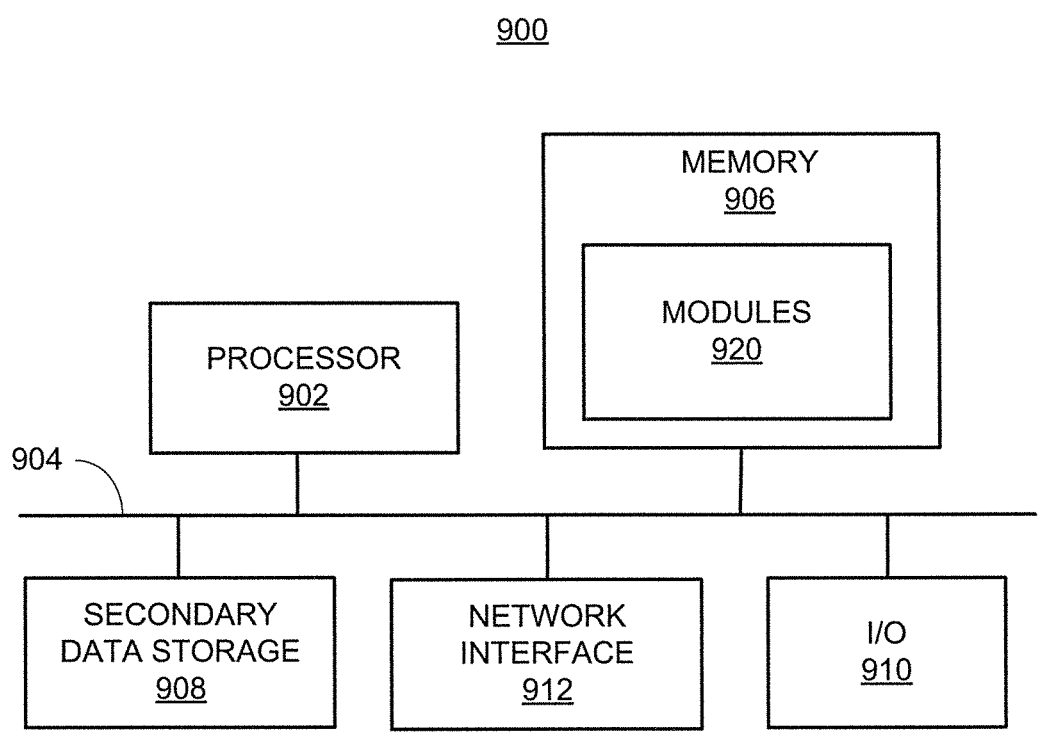
FIG. 9 illustrates a computer system, according to an example of the present disclosure.

FIG. 9 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 902 that may implement or execute machine readable instructions performing some or all of the methods, functions and other processes described herein. Commands and data from the processor 902 are communicated over a communication bus 904. The computer system also includes a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include modules 920 including machine readable instructions residing in the memory 906 during runtime and executed by the processor 902. The modules 920 may include the modules 102, 106, 108, 110, 114, and 116 of the apparatus shown in FIG. 1.

The computer system may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for policy based routing, the method comprising:
  receiving a data packet;
  generating a weight table including an index corresponding to a weight based distribution of a plurality of redirect hosts;
  generating a hash table including an index corresponding to a random distribution of the weight based distribution;
  using an internet protocol address of the data packet to determine a corresponding index value in the hash table index;
  determining an availability status of a redirect host of the plurality of redirect hosts corresponding to the index value; and
  routing, by a processor, the data packet to the redirect host if the availability status is determined to be available.

2. The method of claim 1, further comprising:
  receiving the data packet at an incoming interface of a router.

3. The method of claim 1, further comprising:
  using a subset of the internet protocol address of the data packet to determine the corresponding index value in the hash table index.

4. The method of claim 1, wherein a number of entries in the weight table index is based on a format of the internet protocol address of the data packet.

5. The method of claim 1, wherein a number of entries in the hash table index is based on a format of the internet protocol address of the data packet.

6. The method of claim 1, wherein using the internet protocol address of the data packet to determine the corresponding index value in the hash table index comprises:
  performing a lookup of the hash table by matching an octet of the internet protocol address of the data packet with the hash table index to determine the index value.

7. The method of claim 1, wherein using the internet protocol address of the data packet to determine the corresponding index value in the hash table index comprises:
  multiplying a plurality of octets of the internet protocol address of the data packet to generate a result;
  using the result in a modulo function to determine a hash table lookup value; and
  performing a lookup of the hash table by matching the hash table lookup value with the hash table index to determine the index value.

8. The method of claim 1, wherein using the internet protocol address of the data packet to determine the corresponding index value in the hash table index comprises:

multiplying an octet of the internet protocol address of the data packet with a port value associated with the internet protocol address to generate a result;

using the result in a modulo function to determine a hash table lookup value; and performing a lookup of the hash table by matching the hash table lookup value with the hash table index to determine the index value.

9. The method of claim 1, wherein using the internet protocol address of the data packet to determine the corresponding index value in the hash table index comprises:

multiplying a plurality of octets of the internet protocol address of the data packet with a port value associated with the internet protocol address to generate a result;

using the result in a modulo function to determine a hash table lookup value; and performing a lookup of the hash table by matching the hash table lookup value with the hash table index to determine the index value.

10. The method of claim 1, further comprising:

routing the data packet to a next available redirect host if an availability status is determined to be unavailable.

11. A policy based routing apparatus comprising:

a memory storing a module comprising machine readable instructions to:

generate a hash table including an index corresponding to a random distribution of a plurality of redirect hosts;

receive a data packet;

use an internet protocol address of the data packet to determine a corresponding index value in the hash table index;

determine an availability status of a redirect host of the plurality of redirect hosts corresponding to the index value; and route the data packet to the redirect host if the availability status is determined to be available; and a processor to implement the module.

12. The apparatus of claim 11, further comprising machine readable instructions to:

generate a weight table including an index corresponding to a weight based distribution of the plurality of redirect hosts; and generate the hash table including the index corresponding to the random distribution of the weight based distribution of the plurality of redirect hosts.

13. The apparatus of claim 11, wherein a number of entries in the hash table index is based on a format of the internet protocol address of the data packet.

14. The apparatus of claim 11, further comprising machine readable instructions to:

use a subset of the internet protocol address of the data packet to determine the corresponding index value in the hash table index.

15. A non-transitory computer readable medium having stored thereon machine readable instructions for policy based routing, the machine readable instructions comprising code that when executed by a computer system cause the computer system to:

generate a weight table including an index corresponding to a weight based distribution of a plurality of redirect hosts;

generate a hash table including an index corresponding to a calculated distribution of the weight based distribution;

receive a data packet;

use an internet protocol address of the data packet to determine a corresponding index value in the hash table index;

determine an availability status of a redirect host of the plurality of redirect hosts corresponding to the index value; and route, by a processor, the data packet to the redirect host if the availability status is determined to be available.

* * * * *